United States Patent
Landis

(10) Patent No.: US 7,721,248 B2
(45) Date of Patent: May 18, 2010

(54) CIRCUIT ELEMENT FUNCTION MATCHING DESPITE AUTO-GENERATED DUMMY SHAPES

(75) Inventor: Howard S. Landis, Underhill, VT (US)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 11/752,534

(22) Filed: May 23, 2007

(65) Prior Publication Data

US 2008/0022248 A1    Jan. 24, 2008

Related U.S. Application Data

(62) Division of application No. 10/905,474, filed on Jan. 6, 2005, now Pat. No. 7,269,818.

(51) Int. Cl.
*G06F 17/50* (2006.01)
(52) U.S. Cl. ............. 716/21; 716/8; 716/9; 716/10; 716/11; 716/19; 716/20; 430/5
(58) Field of Classification Search ............. 716/8–11, 716/19–21; 430/5
See application file for complete search history.

(56) References Cited

U.S. PATENT DOCUMENTS

| | | | |
|---|---|---|---|
| 4,377,849 A | | 3/1983 | Finger et al. |
| 4,701,860 A | * | 10/1987 | Mader ............ 716/12 |
| 4,890,238 A | | 12/1989 | Klein et al. |
| 5,309,354 A | | 5/1994 | Dick |
| 5,668,057 A | * | 9/1997 | Eda et al. ............ 438/113 |
| 5,671,152 A | * | 9/1997 | Lavin et al. ............ 716/19 |
| 5,757,656 A | | 5/1998 | Hershberger et al. |

(Continued)

FOREIGN PATENT DOCUMENTS

EP    0405975 A2    1/1991

(Continued)

OTHER PUBLICATIONS

Clemen et al., "Configurable Multi-Port SRAM," IBM Technical Bulletin, vol. 32, No. 10B, Mar. 1990, pp. 197-199.

(Continued)

*Primary Examiner*—Naum B Levin
(74) *Attorney, Agent, or Firm*—Anthony Canale; Hoffman Warnick LLC

(57) ABSTRACT

Methods, systems, program products are disclosed that control placement of dummy shapes about sensitive circuit elements such that the dummy shapes are at least substantially similar for each circuit element even though the dummy shapes are auto-generated. In one embodiment, the invention includes providing dummy shape pattern pitch information to a designer, and allowing placement of circuit elements at integer multiples of one or more of the pitches such that the dummy shapes are at least substantially similar about each instance of the circuit element. Another embodiment includes allowing placement of a marker about a circuit element to indicate an area in which dummy shapes are to be substantially identical, and then using the marker to place the circuit element. Dummy shapes generated within the marker ensure substantially identical dummy shapes for each instance of the circuit element. The invention also includes the integrated circuits formed.

6 Claims, 10 Drawing Sheets

U.S. PATENT DOCUMENTS

| | | | |
|---|---|---|---|
| 5,838,583 A * | 11/1998 | Varadarajan et al. ............ 716/9 |
| 5,923,563 A * | 7/1999 | Lavin et al. ..................... 716/19 |
| 5,946,477 A * | 8/1999 | Ito ................................. 716/9 |
| 6,359,254 B1 | 3/2002 | Brown |
| 6,477,687 B1 * | 11/2002 | Thomas .......................... 716/8 |
| 6,561,236 B1 | 5/2003 | Sperry et al. |
| 6,618,847 B1 * | 9/2003 | Hulse et al. ..................... 716/8 |
| 6,651,236 B2 | 11/2003 | Ichimiya et al. |
| 6,668,362 B1 | 12/2003 | McIlwain et al. |
| 6,714,903 B1 * | 3/2004 | Chu et al. ...................... 703/19 |
| 6,718,527 B2 | 4/2004 | Li ................................. 716/5 |
| 6,751,785 B1 * | 6/2004 | Oh ............................... 716/10 |
| 6,777,813 B2 * | 8/2004 | Juengling et al. ............ 257/775 |
| 6,795,955 B2 * | 9/2004 | MacLean et al. ............... 716/10 |
| 6,904,581 B1 * | 6/2005 | Oh ............................... 716/10 |
| 6,948,146 B2 * | 9/2005 | Allen et al. ................... 716/13 |
| 7,007,259 B2 * | 2/2006 | Shrowty et al. ............... 716/10 |
| 7,015,582 B2 * | 3/2006 | Landis ........................ 257/758 |
| 7,086,020 B2 * | 8/2006 | Chen et al. ..................... 716/4 |
| 7,117,469 B1 * | 10/2006 | Dahl ............................ 716/11 |
| 7,124,386 B2 * | 10/2006 | Smith et al. ................... 716/10 |
| 7,131,094 B2 * | 10/2006 | Kolk et al. .................... 716/12 |
| 7,222,322 B1 * | 5/2007 | Chyan et al. .................. 716/12 |
| 7,250,363 B2 * | 7/2007 | Landis et al. ............... 438/622 |
| 7,269,818 B2 * | 9/2007 | Landis ......................... 716/21 |
| 7,305,643 B2 * | 12/2007 | McClellan et al. ............ 716/10 |
| 7,346,878 B1 * | 3/2008 | Cohen et al. .................... 716/11 |
| 2002/0033488 A1 * | 3/2002 | Kawashima et al. ........ 257/202 |
| 2002/0087942 A1 | 7/2002 | Kitada |
| 2002/0116686 A1 | 8/2002 | Shin et al. |
| 2003/0152873 A1 * | 8/2003 | Tainaka et al. ............... 430/313 |
| 2003/0177465 A1 * | 9/2003 | MacLean et al. .............. 716/11 |
| 2003/0226757 A1 * | 12/2003 | Smith et al. .................... 205/82 |
| 2004/0083438 A1 | 4/2004 | Ohba et al. |
| 2005/0028121 A1 * | 2/2005 | Shrowty et al. ............... 716/10 |
| 2005/0044522 A1 * | 2/2005 | Maeda ......................... 716/18 |
| 2005/0064302 A1 * | 3/2005 | Kotani et al. .................... 430/5 |
| 2005/0251771 A1 * | 11/2005 | Robles ........................... 716/5 |
| 2006/0273460 A1 * | 12/2006 | Filippi et al. ................. 257/747 |

FOREIGN PATENT DOCUMENTS

| | | |
|---|---|---|
| JP | 11355643 A | 12/1999 |
| JP | 2002009161 A | 1/2002 |
| JP | 2002203905 A | 7/2002 |

OTHER PUBLICATIONS

European Patent Office Communication, Reference No. BUR920040145EP1, Application No. 05854489.1, Oct. 5, 2009, 7 pages.

Unknown, "Information Disclosures Statement," IBM China Ltd, Aug. 8, 2008, 1 page.

* cited by examiner

172

CIRCUIT ELEMENT FUNCTION MATCHING DESPITE AUTO-GENERATED DUMMY SHAPES

This application is a divisional of Ser. No. 10/905,474, now U.S. Pat. No. 7,269,818, filed Jan. 6, 2005.

BACKGROUND OF THE INVENTION

1. Technical Field

The present invention relates generally to integrated circuit (IC) design, and more particularly, to IC design providing substantial matching functioning of circuit elements despite use of auto-generated dummy shapes.

2. Related Art

As silicon technologies offer constantly increasing levels of integration, application specific integrated circuit (ASIC) designers are continually challenged to increase productivity and produce larger and larger designs with the same or less resources. Use of smaller circuit elements, sometimes referred to as "macros," each of which include a predetermined structure for a part of an integrated circuit (IC) and can be used repetitively, is one technique for addressing this challenge. Use of repetitive circuit elements eliminates the need for the IC designer to continually re-design sections of the chip, and therefore improves productivity. As a result, design reuse methodology involving the use of IC circuit elements has become an essential part of IC design.

The designer that uses IC circuit elements is challenged to provide a product that has predictable functioning for these IC circuit elements. One challenge is matching the electrical behavior of two or more instances of the same circuit element in different locations in an IC design. This is generally at odds with automatically generated filler shapes, which are placed in the overall design after the layout is complete, and after the designer has performed all circuit analyses. In particular, if the design system uses automatically placed "dummy fill," or other auto-generated dummy shapes, the dummy shapes will be automatically placed around the circuit element. If the circuit element is a sensitive circuit, the designer may wish to insure that every instance of the circuit element function matches as identically as possible to every other instance within the IC. Auto-generated dummy shapes, however, are typically located on a consistent grid across an IC design such that different instances of the circuit element may find themselves in substantially different local environments. That is, there is no guarantee that different instances of the same circuit element will see the same local environment, e.g., dummy fill and hole shapes, when placed within the IC design. Any resulting mismatch in electrical parameters (e.g., resistance, capacitance, etc.) is unknown to the designer, and acts to degrade the function of the precision circuits in question. In order to address this issue, many designers attempt to inhibit the automatic generation of dummy shapes in the vicinity of sensitive circuits, and place all required dummy shapes by hand. This approach, however, is more difficult for the designer, and is generally detrimental to the overall manufacturability and process window.

In view of the foregoing, there is a need in the art for a way to design ICs that overcomes the problems of the related art.

SUMMARY OF THE INVENTION

The invention includes methods, systems and program products that control placement of dummy shapes about sensitive circuit elements such that the dummy shapes are at least substantially similar for each circuit element even though the dummy shapes are auto-generated. In one embodiment, the invention includes providing a dummy shape pattern's pitch information to a designer, and allowing placement of circuit elements at integer multiples of one or more of the pitches such that the dummy shapes are at least substantially similar about each instance of the circuit element. Another embodiment includes allowing placement of a marker about a circuit element to indicate an area in which dummy shapes are to be substantially identical, and then using the marker to place the circuit element. Dummy shapes generated within the marker ensure substantially identical dummy shapes for each instance of the circuit element. The invention also includes the integrated circuits formed.

A first aspect of the invention is directed to a method of forming part of an integrated circuit, the method comprising the steps of: providing a dummy shape pattern having an X pitch and a Y pitch between dummy shapes within the dummy shape pattern; allowing placement of a plurality of substantially identical circuit elements on a substrate, the circuit elements spaced apart an integer multiple of at least one of the X pitch and the Y pitch; and generating the circuit elements and the dummy shape pattern between the circuit elements to provide substantially similar dummy shapes adjacent to each of the circuit elements.

A second aspect of the invention is directed to an integrated circuit comprising: a dummy shape pattern on a substrate, the dummy shape pattern having an X pitch and a Y pitch between dummy shapes within the dummy shape pattern; and a plurality of substantially identical circuit elements on the substrate, the circuit elements spaced apart an integer multiple of at least one of the X pitch and the Y pitch such that substantially similar dummy shapes are adjacent to each of the circuit elements.

A third aspect of the invention is directed to a computer program product comprising a computer useable medium having computer readable program code embodied therein for designing an integrated circuit (IC) using a plurality pf identical circuit elements, the program product comprising: program code configured to obtain an X pitch and a Y pitch of dummy shapes within a dummy shape pattern for an IC design; and program code configured to place the plurality of substantially identical circuit elements spaced apart an integer multiple of at least one of the X pitch and the Y pitch of dummy shapes to provide substantially similar dummy shapes adjacent to each of the circuit elements.

A fourth aspect of the invention is directed to a computer program product comprising a computer useable medium having computer readable program code embodied therein for ensuring substantially identical dummy shapes for a circuit element during design of an integrated circuit (IC), the program product comprising: program code configured to obtain a circuit element to be used multiple times within an IC design; program code configured to selectively form a marker about the circuit element to indicate an area in which dummy shapes about the circuit element are to be substantially identical; and program code configured to use the marker to identify placement of copies of the circuit element in the IC design.

A fifth aspect of the invention is directed to a method of ensuring substantially identical dummy shapes for a circuit element during design of an integrated circuit (IC), the method comprising the steps of: receiving an IC design including a marker indicating an area about the circuit element in which dummy shapes about the circuit element are to be substantially identical; forming the circuit element multiple times within the IC design; and generating dummy shapes including substantially identical dummy shapes about each circuit element within the area indicated by a respective marker.

A sixth aspect of the invention relates to an integrated circuit comprising: a plurality of substantially identical circuit elements on a substrate, each circuit element having an area about the circuit element in which dummy shapes are substantially identical to dummy shapes about each other circuit element.

The foregoing and other features of the invention will be apparent from the following more particular description of embodiments of the invention.

BRIEF DESCRIPTION OF THE DRAWINGS

The embodiments of this invention will be described in detail, with reference to the following figures, wherein like designations denote like elements, and wherein.

DETAILED DESCRIPTION OF THE INVENTION

For purposes of clarity only, the description includes the following headings: I. Environment and Systems Overview; II. Operational Methodology; and III. Conclusion.

Figure 1:
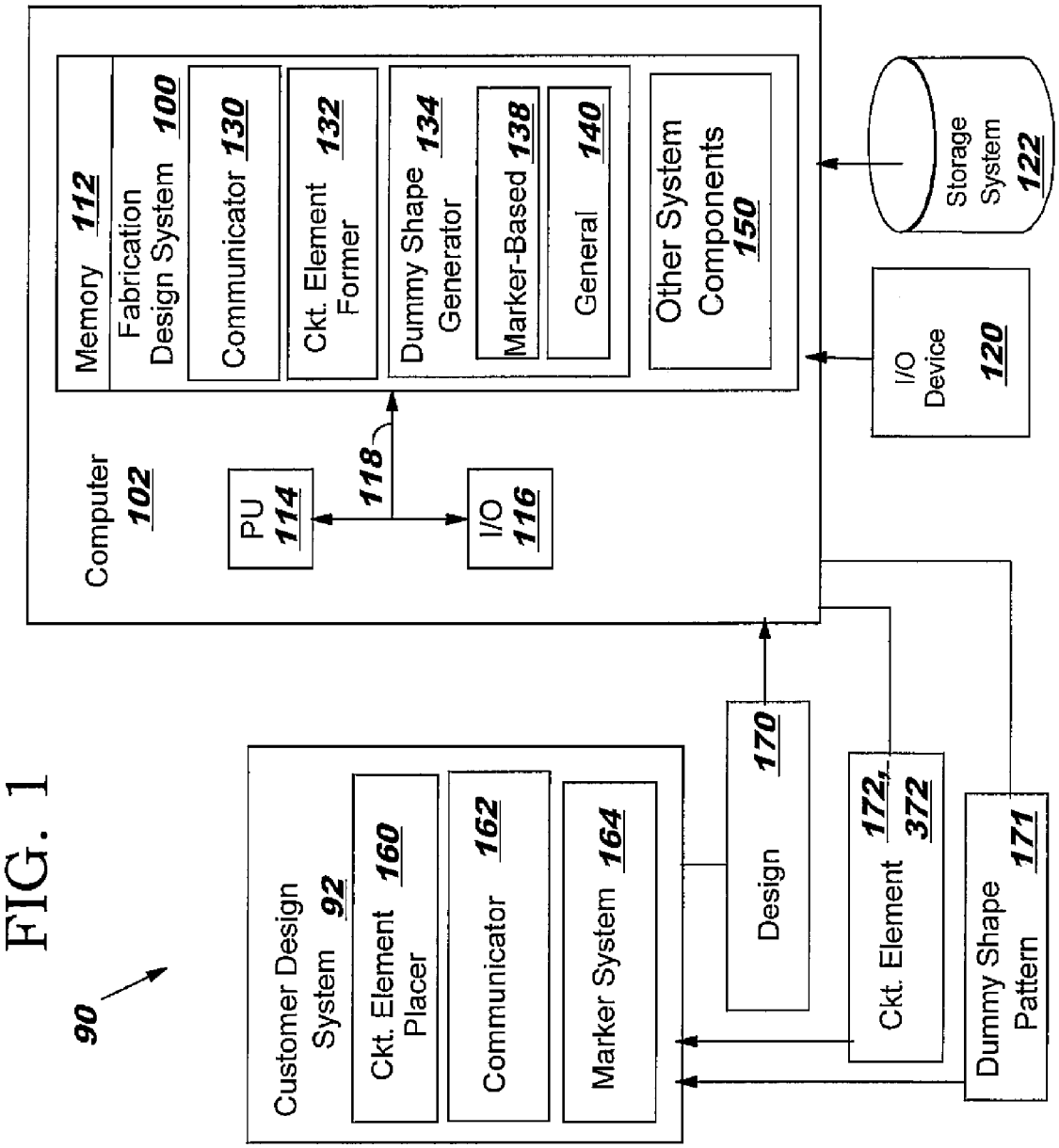
FIG. 1 shows a block diagram of a design environment according to the invention.

I. Environment and Systems Overview:

With reference to the accompanying drawings, FIG. 1 is a block diagram of a design environment 90 in accordance with the invention. Design environment 90 includes a customer design system 92 on which a designer designs an integrated circuit (IC), and a fabrication design system 100 that receives the design, modifies the design and generates the IC. Typically, a customer of fabrication design system 100 designs an integrated circuit on customer design system 92 and provides data thereabout for fabrication by system 100. It should be recognized, however, that this environment is illustrative only, and that the invention may be employed in other environments.

For purposes of brevity, the structure of fabrication design system 100 only will be described. It should be recognized, however, that customer design system 92 may include similar structure. System 100 is shown implemented on computer 102 as computer program code. To this extent, computer 102 is shown including a memory 112, a processing unit (PU) 114, an input/output (I/O) interface 116, and a bus 118. Further, computer 102 is shown in communication with an external I/O device/resource 120 and a storage system 122. In general, processor 114 executes computer program code, such as system 100, that is stored in memory 112 and/or storage system 122. While executing computer program code, processor 114 can read and/or write data to/from memory 112, storage system 122, and/or I/O device 120. Bus 118 provides a communication link between each of the components in computer 102, and I/O device 120 can comprise any device that enables a user to interact with computer 102 (e.g., keyboard, pointing device, display, etc.).

Alternatively, a user can interact with another computing device (not shown) in communication with computer 102. In this case, I/O device 116 can comprise any device that enables computer 102 to communicate with one or more other computing devices over a network (e.g., a network system, network adapter, I/O port, modem, etc.). The network can comprise any combination of various types of communications links. For example, the network can comprise addressable connections that may utilize any combination of wireline and/or wireless transmission methods. In this instance, the computing devices (e.g., computer 102) may utilize conventional network connectivity, such as Token Ring, Ethernet, WiFi or other conventional communications standards. Further, the network can comprise one or more of any type of network, including the Internet, a wide area network (WAN), a local area network (LAN), a virtual private network (VPN), etc. Where communications occur via the Internet, connectivity could be provided by conventional TCP/IP sockets-based protocol, and a computing device could utilize an Internet service provider to establish connectivity to the Internet.

Computer 102 is only representative of various possible combinations of hardware and software. For example, processor 114 may comprise a single processing unit, or be distributed across one or more processing units in one or more locations, e.g., on a client and server. Similarly, memory 112 and/or storage system 122 may reside at one or more physical locations. Memory 112 and/or storage system 122 can comprise any combination of various types of computer-readable media and/or transmission media including magnetic media, optical media, random access memory (RAM), read only memory (ROM), a data object, etc. I/O interface 116 can comprise any system for exchanging information with one or more I/O devices 120. Further, it is understood that one or more additional components (e.g., system software, math co-processor, etc.—not shown) can be included in computer 102. To this extent, computer 102 can comprise any type of computing device such as a network server, a desktop computer, a laptop, a handheld device, a mobile phone, a pager, a personal data assistant, etc. However, if computer 102 comprises a handheld device or the like, it is understood that one or more I/O devices 120 (e.g., a display) and/or storage system 122 could be contained within computer 102, not externally as shown.

As discussed further below, fabrication design system 100 is shown including a communicator 130, a circuit (ckt.) element former 132, a dummy shape generator 134 including a marker-based shape generator 138 and general dummy shape generator 140, and other system components 150. Customer design system 92 may include a circuit (ckt.) element placer 160, a communicator 162 and a marker system 164. It should be recognized that while systems 92, 100 have each been illustrated as standalone systems, each may be included as part of larger IC design system(s) or peripheral(s) thereto. Accordingly, other conventional IC design systems (not shown) may also be provided in each system.

Figure 2:
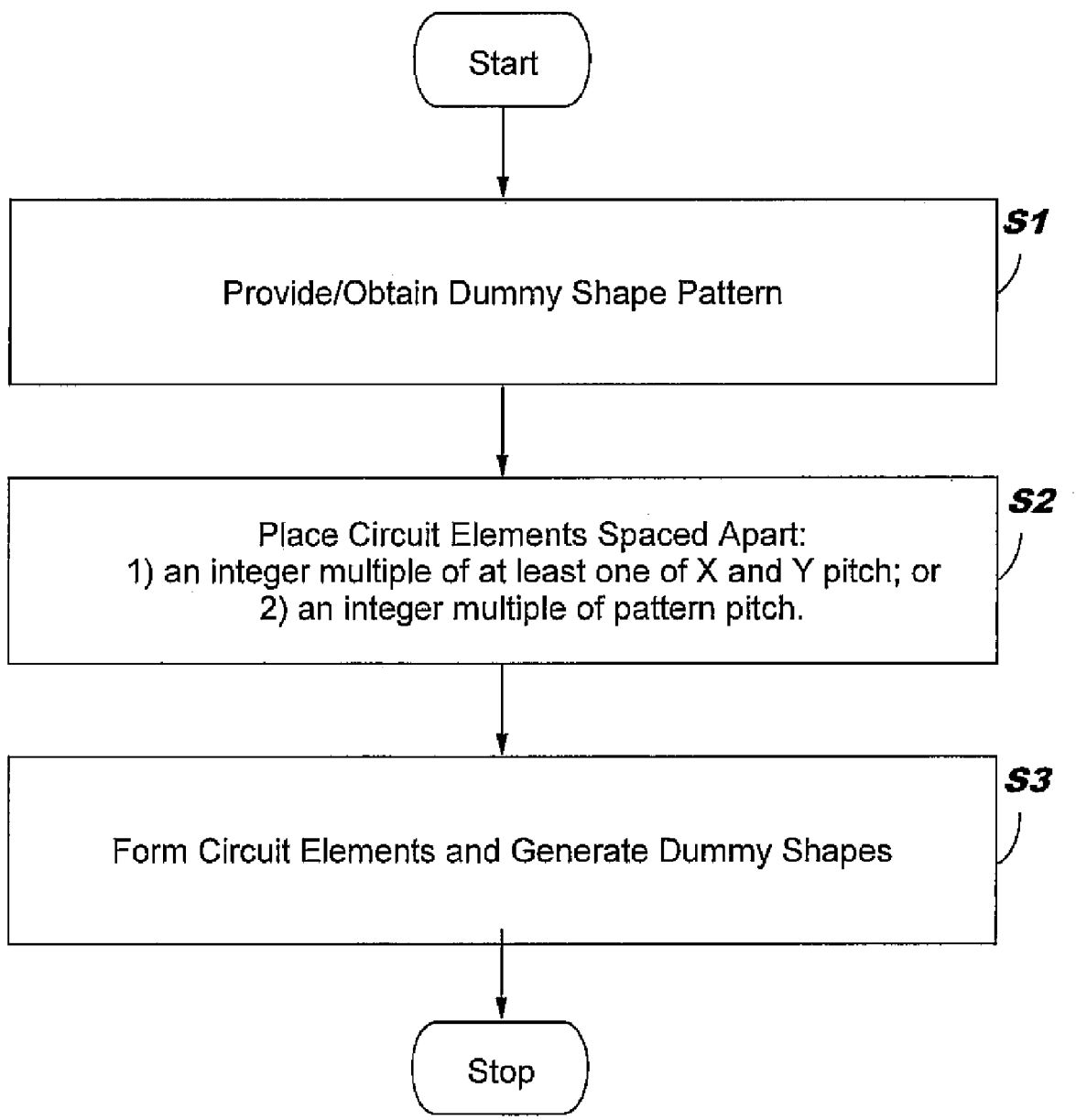
FIG. 2 shows a flow diagram of a method according to a first embodiment of the invention.
Figure 3:
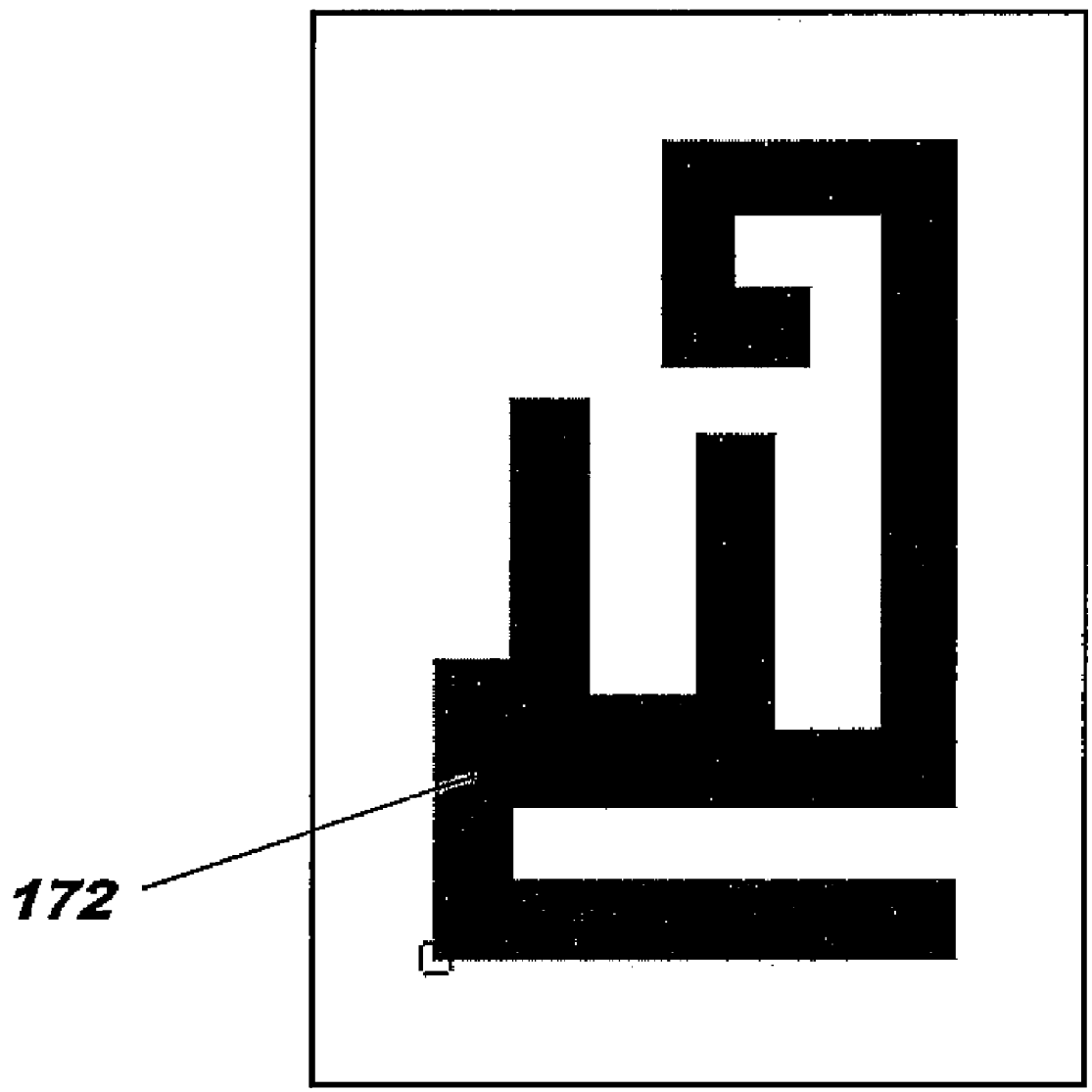
FIG. 3 shows an example circuit element.

II. Operational Methodology:

Turning to FIG. 2, a flow diagram of operational methodology according to a first embodiment of the invention is shown. It should be recognized that although the invention will be described in a particular flow, the invention can be compartmentalized to include only various steps, as outlined in the attached claims. FIG. 3 illustrates an example circuit element 172 for use in describing the methodology.

Figure 4:
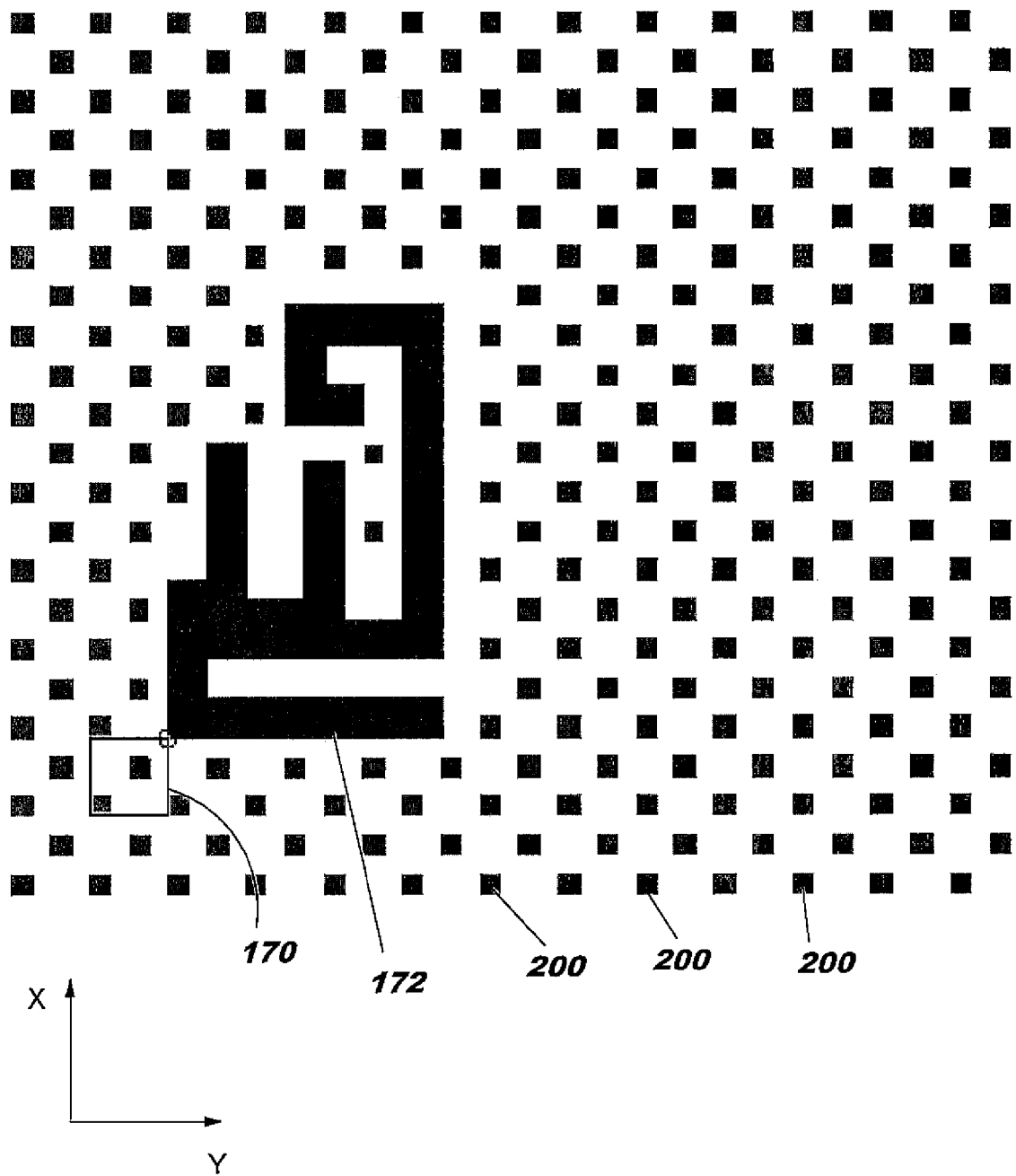
FIG. 4 shows the example circuit element of FIG. 3 surrounded by auto-generated dummy shapes according to a dummy shape pattern.
Figure 5:
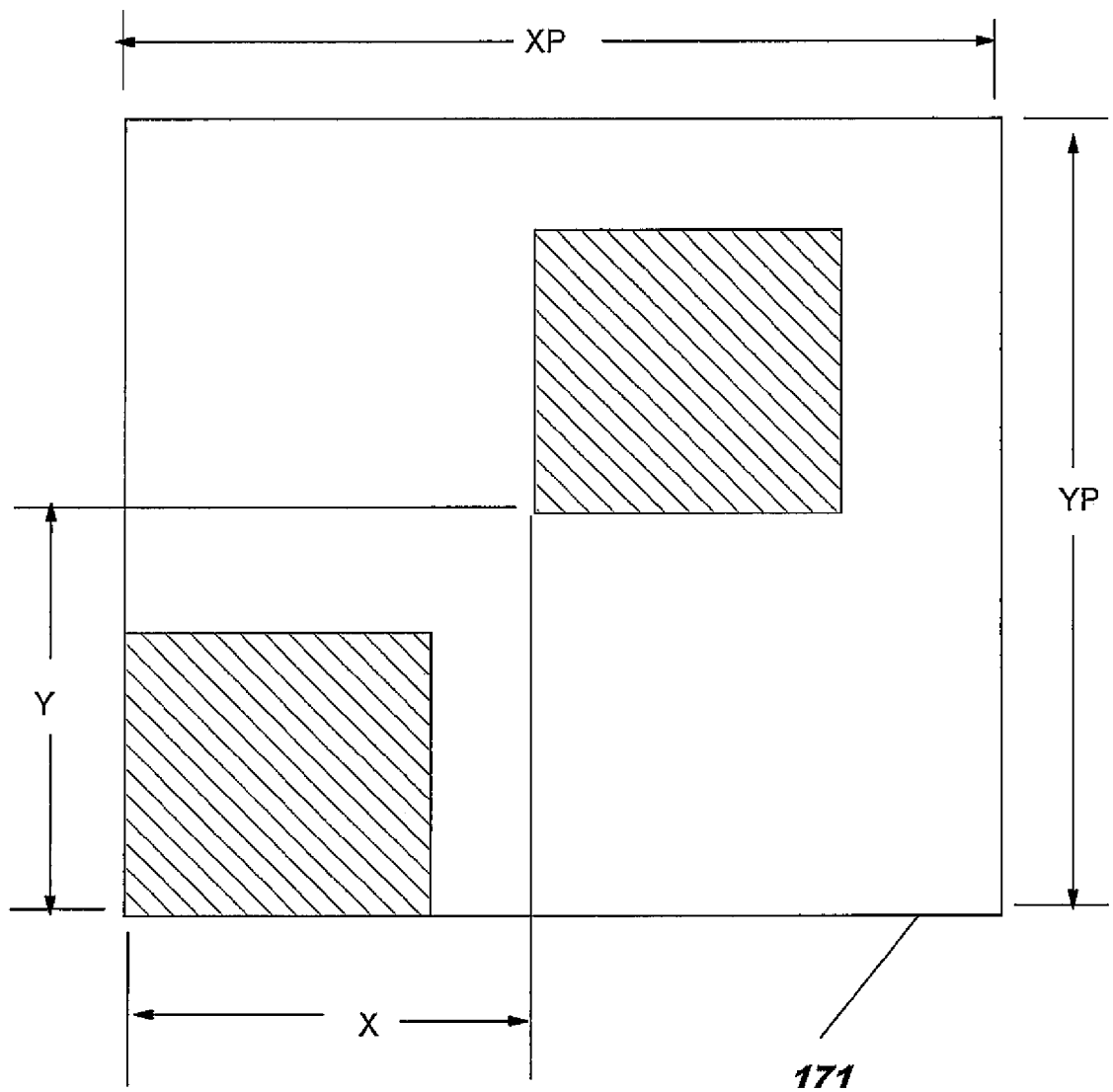
FIG. 5 shows details of the dummy shape pattern of FIG. 4.

Referring to FIG. 1, in conjunction with FIG. 2, in a first step S1, fabrication design system 100 provides a dummy shape pattern 171 (FIG. 1) via communicator 130, or customer design system 92 obtains dummy shape pattern 171 via communicator 162. As used herein, a "dummy shape" may include any now known or later developed fill or hole shape. FIG. 4 shows a circuit element 172 surrounded by dummy shapes 200 in the form of fill shapes. A dummy shape pattern 171 is illustrated by a box. Each "dummy shape pattern" 171 is a layout of a particular number of fill or hole shapes 200 to be repeated over a circuit design. As shown in FIG. 5, each dummy shape pattern 171 has an X pitch (X) and a Y pitch (Y) between dummy shapes 200 within the dummy shape pattern 171. As illustrated, the X pitch and Y pitch appear as the same size, but this is not necessary. Each dummy shape pattern 171 also includes a pattern X pitch (XP), i.e., a height of the entire dummy shape pattern, and a pattern Y pitch (YP), i.e., a width of the entire dummy shape pattern. In one embodiment, the X pitch is one half the pattern X pitch, and the Y pitch is one half the pattern Y pitch.

Figure 6:
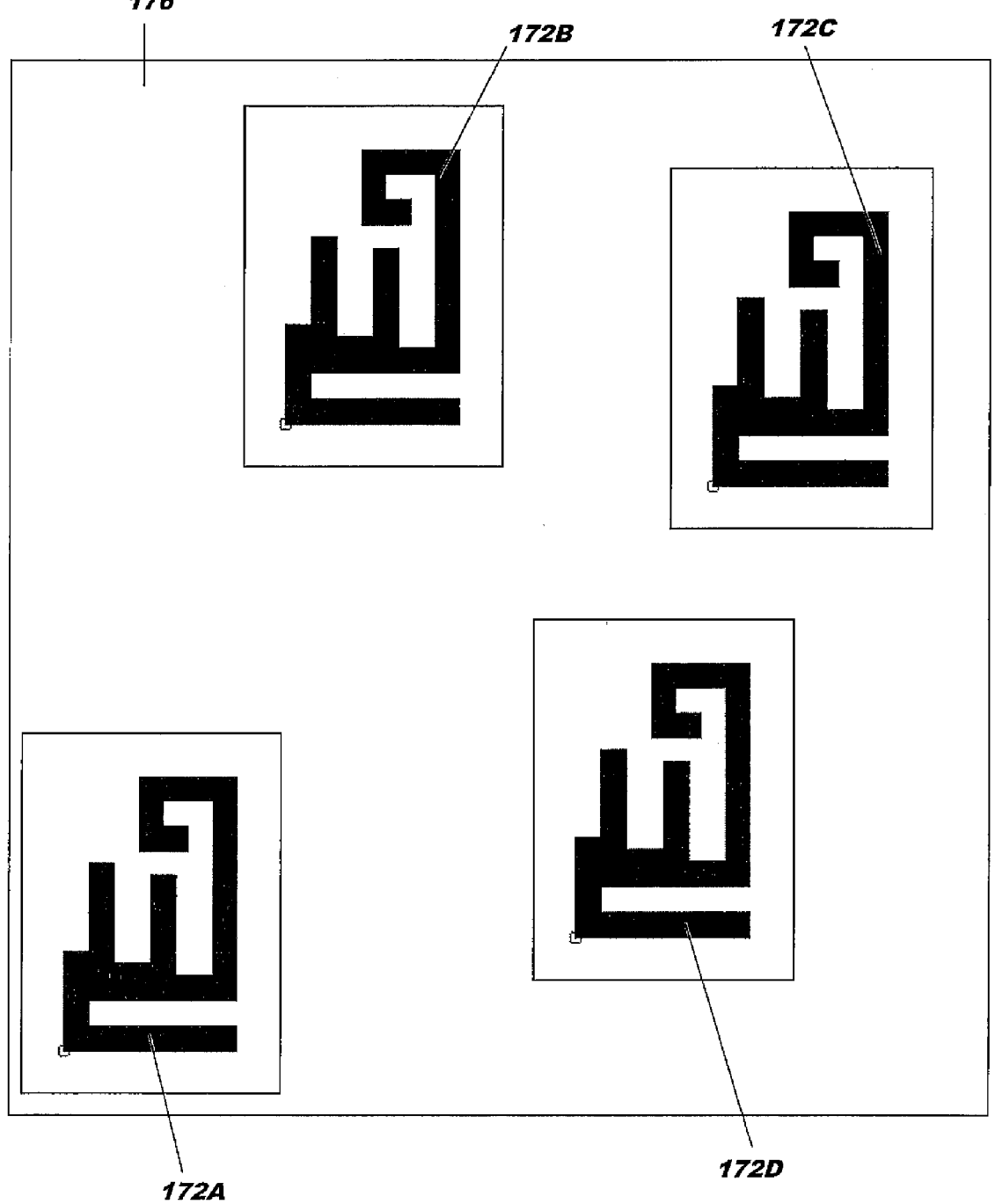
FIG. 6 shows placement of the example circuit element of FIG. 3 on a substrate as part of an integrated circuit (IC) design.

A second step S2, as shown in FIGS. 2 and 6, includes allowing placement of a plurality of substantially identical circuit elements 172A-D on a substrate 176. In one embodiment, as shown in FIG. 1, this step is carried out by circuit element placer 160 located at customer design system 92, but this step could be carried out by fabrication design system 100. Circuit element placer 160 may include any now known or later developed interface (e.g., a graphical user interface) for a user to place circuit elements 172. In any event, circuit element placer 160 allows placement of circuit elements 172A-D spaced apart an integer multiple of: 1) the X pitch or the Y pitch of dummy shape pattern 171; 2) both the X pitch and the Y pitch; 3) the pattern X pitch or the pattern Y pitch; or 4) both the pattern X pitch and the pattern Y pitch.

Figure 7:
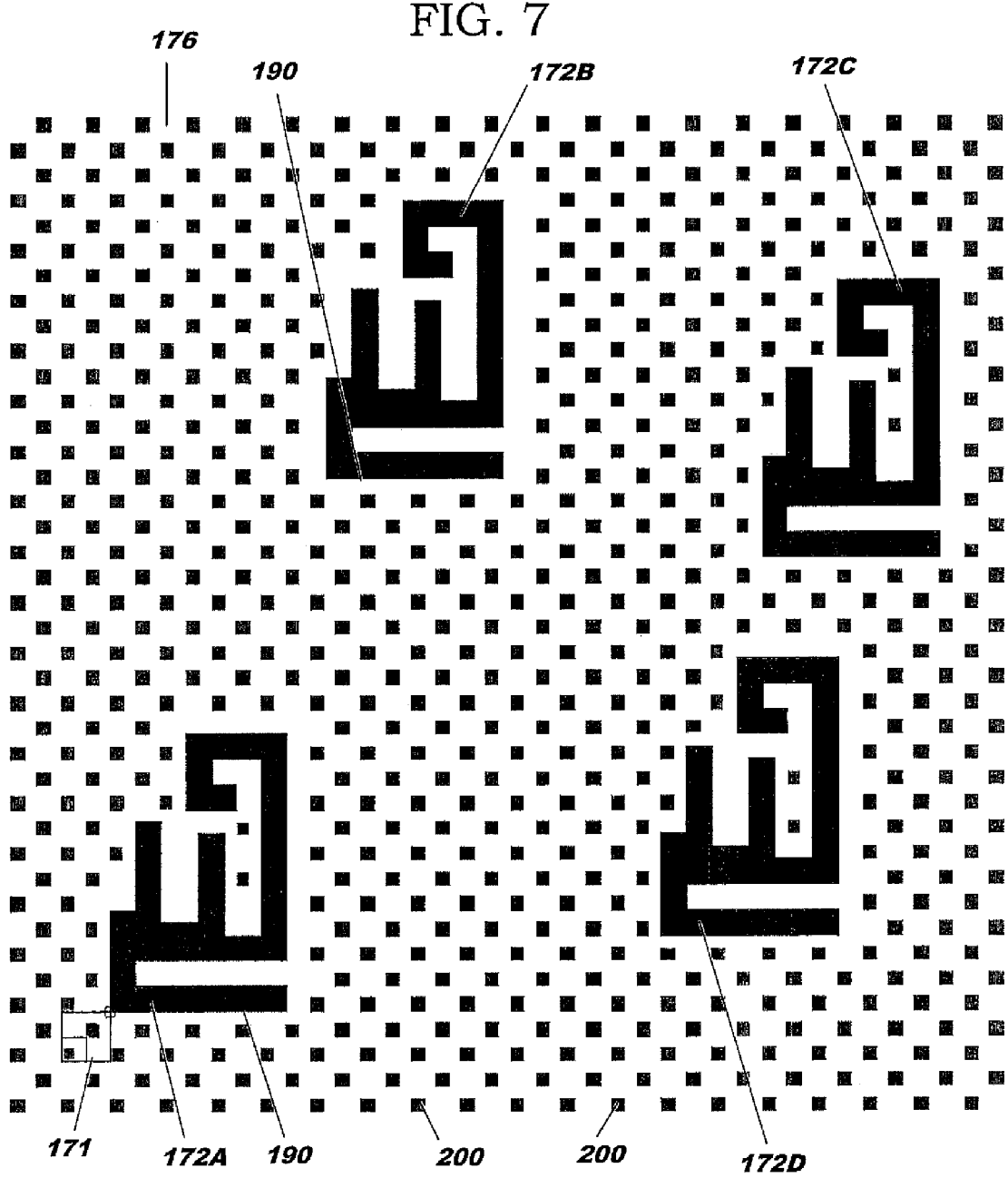
FIG. 7 shows generation of dummy shapes about the IC design of FIG. 6.

In step S3, as shown in FIGS. 2 and 7, circuit elements 172A-D are formed by circuit element former 132 (FIG. 1) and dummy shape pattern 171 is automatically generated between circuit elements 172 by dummy shape generator 134 in a conventional fashion, i.e., using general dummy shape generator 140 (FIG. 1). In the case that circuit elements 172A-D are placed at an integer multiple of at least one of the X pitch and the Y pitch, then the generating step provides "substantially similar" dummy shapes 200 adjacent each of the circuit elements 172A-D. For example, when an integer multiple of the X pitch is used, it ensures that a distance between a horizontal edge 190 of each instance of the circuit element 172 to the nearest row of dummy shapes 200 is going to be substantially identical. For example, circuit elements 172A and 172B have substantially identical lower rows of dummy shapes 200, but not identical upper rows or identical columns. Accordingly, these circuit elements have "substantially similar" dummy shapes Where both an integer of the X pitch and the Y pitch are used, each instance of circuit elements are even more substantially similarly surrounded by dummy shapes 200, i.e., the distance from a horizontal edge to the nearest row of dummy shapes and the distance from a vertical edge to the nearest column of dummy shapes will be substantially similar for each instance of circuit element 172. In view of the foregoing, "substantially similar" means that the distance between a particular edge of a circuit element and the nearest row (if X pitch used) and/or column (if Y pitch used) of dummy shapes is the same for different instances of the circuit element. However, the exact placement of dummy shapes with respect to a particular point in the circuit element may not be identical.

In the case where integer multiples of one of the pattern pitches are used, the circuit elements 172 are even more identically positioned relative to dummy shapes 200. In particular, use of the pattern pitch ensures that the nearest rows or columns of dummy shapes 200 are "substantially identical." "Substantially identical" means that the placement of adjacent dummy shapes relative to a particular point in the circuit element is identical (or very close to identical) for all instances and all placements of the circuit element for the direction used, i.e., X and/or Y. In particular, for a selected direction, the distances in that direction between a particular point in the circuit element and every adjacent dummy shape is identical (or very close to identical), and the position of each dummy shape relative to a particular point of the circuit element in that direction is identical (or very close to identical) for each instance of the circuit element. Furthermore, where both the pattern X and Y pitches are used, the distances in both X and Y directions between a particular point in the circuit element and every adjacent dummy shape, and the position of each dummy shape relative to the particular point, are identical (or very close to identical) for each instance of the circuit element. For example, as shown in FIG. 7, circuit elements 172A and 172C are placed using integer multiples of both the pattern X pitch and the pattern Y pitch, and accordingly, have substantially identical dummy shapes about them in the X and Y direction in terms of distances between edges and placement.

An integrated circuit formed by the above method includes a dummy shape pattern 171 on a substrate 176 having an X pitch and a Y pitch between dummy shapes 200 within the dummy shape pattern 171, and a plurality of substantially identical circuit elements 172A-D on substrate 176. Circuit elements 172A-D are spaced apart an integer multiple of at least one of the X pitch and the Y pitch such that they have substantially similar dummy shapes adjacent each of the circuit elements. More particularly, as described above, circuit elements 172 may be spaced apart an integer multiple of: 1) the X pitch or the Y pitch of dummy shape pattern 171; 2) both the X pitch and the Y pitch; 3) the pattern X pitch or the pattern Y pitch; or 4) both the pattern X pitch and the pattern Y pitch.

Figure 8:
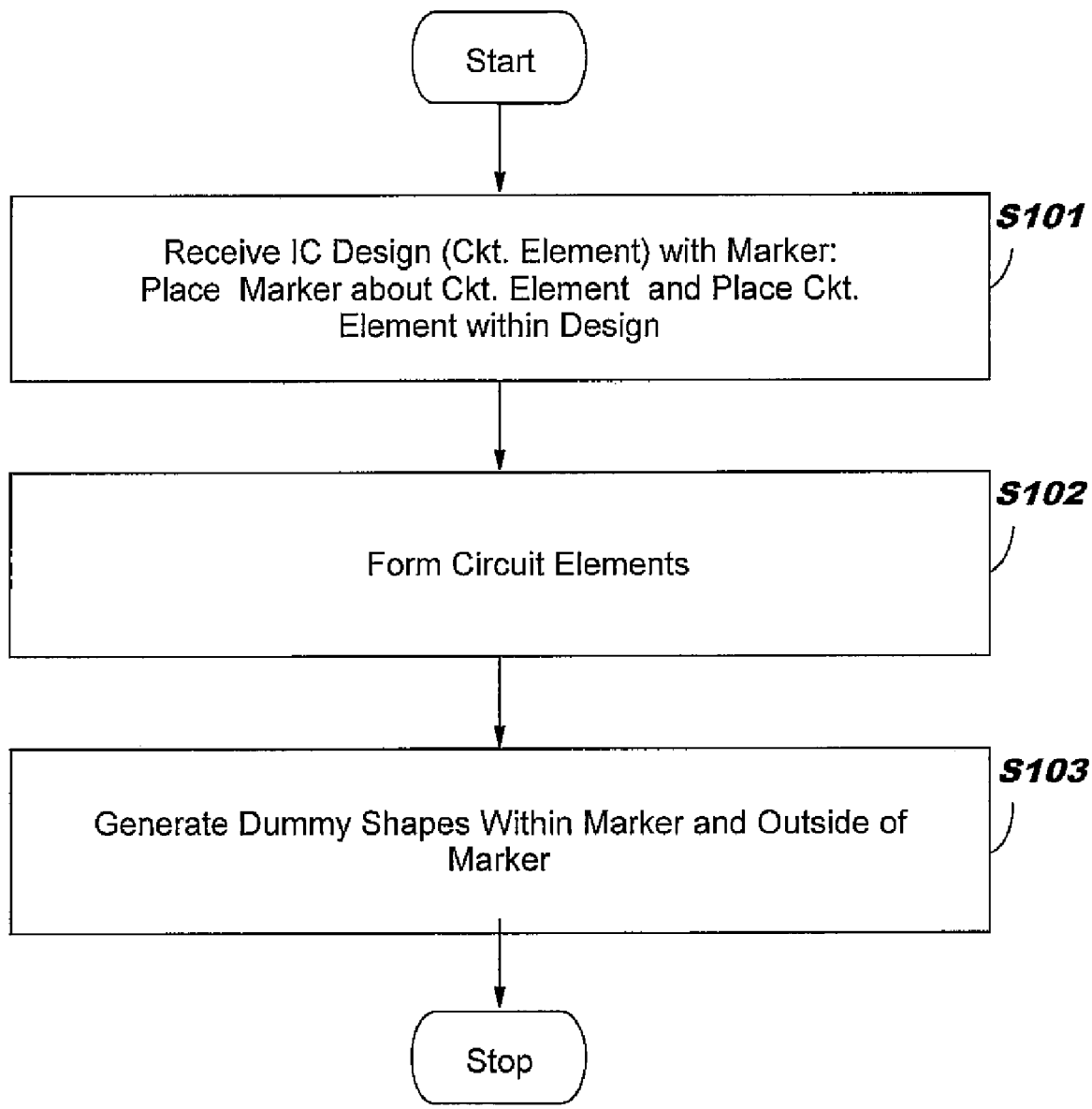
FIG. 8 shows a flow diagram of a method according to a second embodiment of the invention.
Figure 9:
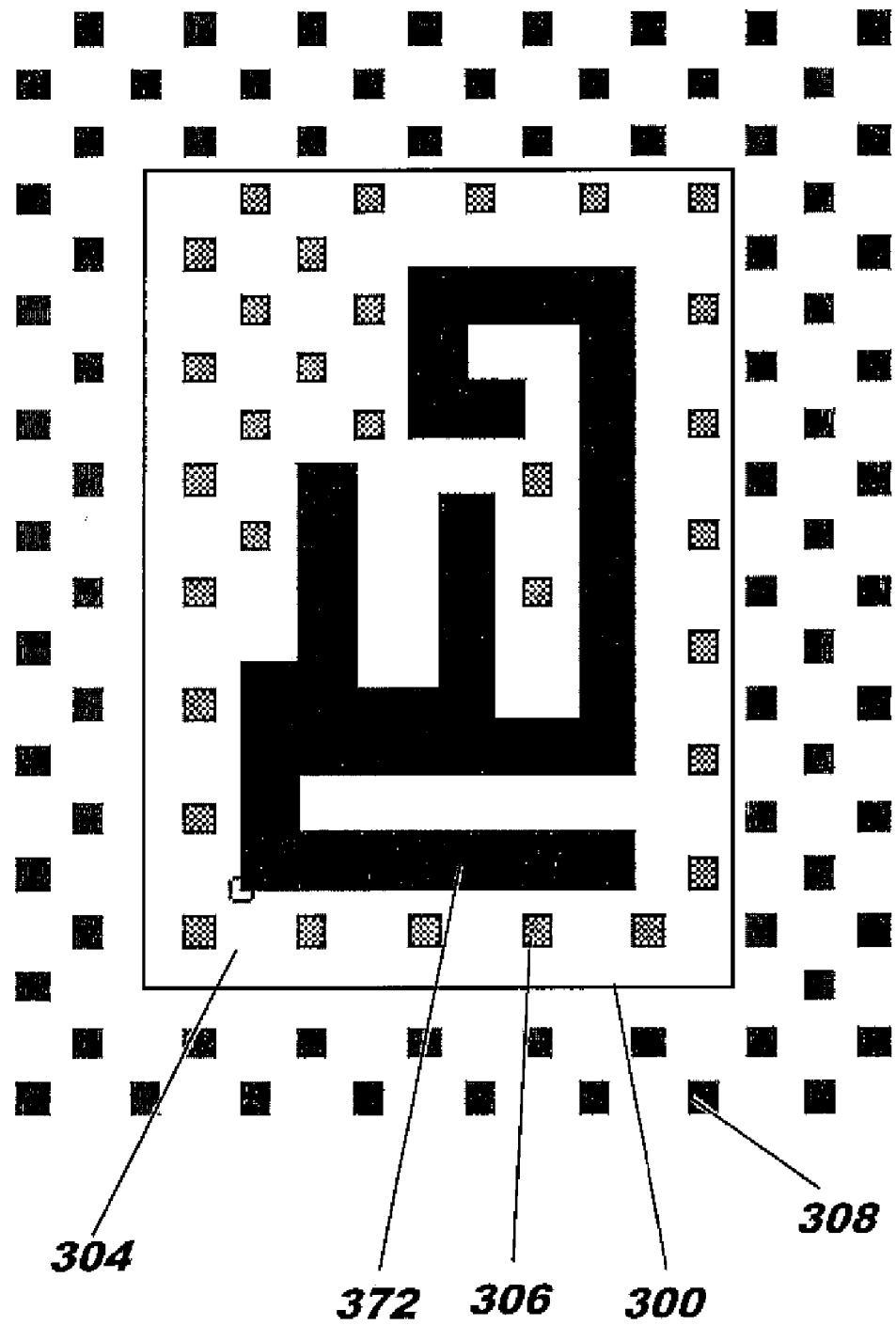
FIG. 9 shows the example circuit element of FIG. 3 including a marker indicating an area in which dummy shapes are to be substantially identical for each instance of the circuit element.
Figure 10:
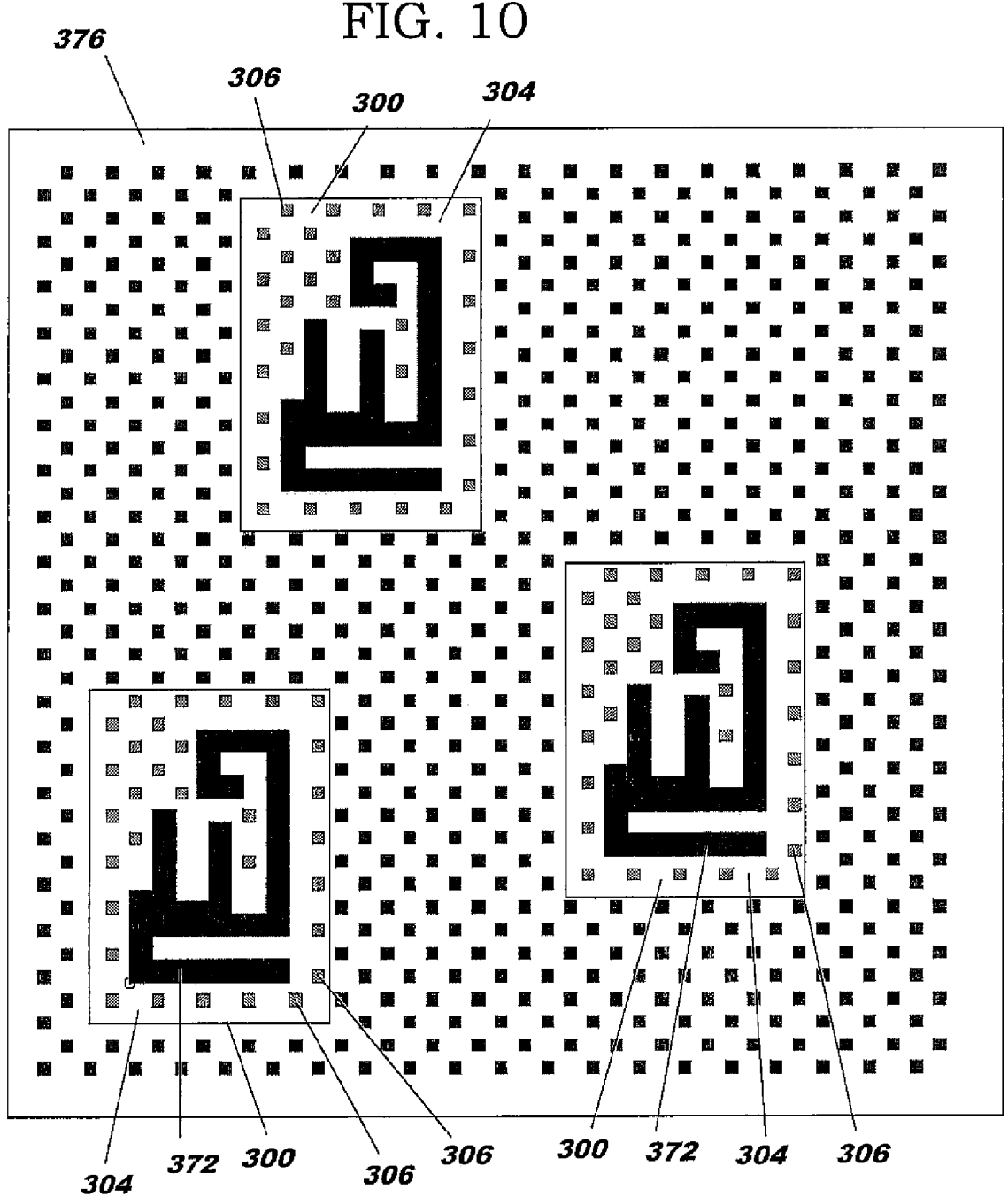
FIG. 10 shows the marker and circuit element of FIG. 9 used in an IC design and the dummy shapes generated thereabout.

Turning to FIG. 8, a flow diagram of a second embodiment of the invention is shown. As shown in FIG. 9, this embodiment entails use of a marker 300 about a circuit element 372, which indicates an area 304 in which dummy shapes 306 about the circuit element are to be substantially identical. Dummy shapes 308 outside of marker 300 are generated in a conventional fashion. As shown in FIG. 10, markers 300 can then be used to place circuit elements 372 throughout a design so as to obtain substantially identical dummy shapes 306 about circuit elements 372.

As shown in FIGS. 1 and 8, in a first step S101, an IC design 170 is received by communicator 130 of fabrication design system 100 including a marker 300 indicating an area 304 about circuit element 372 in which dummy shapes 306 about the circuit element are to be substantially identical. In one embodiment, a circuit element 372 may be initially provided to a user either by fabrication design system 100 via communicator 130 or as a selectable circuit element at customer design system 92. A user of customer design system 92 can then use an interface such as a marker system 164 to selectively form a marker 300 about the circuit element to indicate to a dummy shape generator 134, i.e., marker-based dummy shape generator 138, an area 304 in which dummy shapes 306 about circuit element 372 are to be substantially identical. A user can then place circuit elements 372 throughout a design using circuit element placer 160 of customer design system 92. In this case, however, circuit element placer 160 prohibits placement of markers 300 such that they overlap, i.e., are on top of one another.

In step S102, circuit element 372 is formed multiple times within the IC design by circuit element former 132, i.e., after the design is forwarded back to fabrication design system 100. In step S103, dummy shapes 306 are generated including substantially identical dummy shapes 306 about each circuit element 372 (i.e., by marker-based dummy shape generator 138) within area 304 as indicated by a respective marker 300. Dummy shapes 308 outside of marker 300 are also generated by general dummy shape generator 140 in a conventional fashion.

As shown in FIG. 10, an integrated circuit formed by the above-described alternative embodiment includes a plurality of substantially identical circuit elements 372 on a substrate 376, each circuit element 372 has an area 304 about the circuit element in which dummy shapes 306 are substantially identical to dummy shapes about each other circuit element 372. Circuit elements 372 do not overlap, i.e., are not on top of each other.

III. Conclusion:

It should be recognized that the steps of the above-described methods may occur at locations other than as shown. For example, all of the steps may occur at fabrication design system 100.

It is understood that the present invention can be realized in hardware, software, a propagated signal, or any combination thereof, and may be compartmentalized other than as shown. Any kind of computer/server system(s)—or other apparatus adapted for carrying out the methods described herein—is suitable. A typical combination of hardware and software could be a general purpose computer system with a computer program that, when loaded and executed, carries out the respective methods described herein. Alternatively, a specific use computer, containing specialized hardware for carrying out one or more of the functional tasks of the invention (e.g., design system 92 and/or 100), could be utilized. The present invention also can be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form. Furthermore, it should be appreciated that the teachings of the present invention could be offered as a business method on a subscription or fee basis. For example, the system and/or computer could be created, maintained, supported and/or deployed by a service provider that offers the functions described herein for customers. That is, a service provider could offer the functionality described above.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

What is claimed is:

1. A computer program product comprising a computer useable storage medium having computer readable program code embodied therein for ensuring substantially identical dummy shapes for a circuit element during design of an integrated circuit (IC), the program product comprising:
   program code configured to obtain a circuit element to be replicated and used multiple times within an IC design;
   program code configured to selectively form a marker about the circuit element to indicate an area in which dummy shapes about the circuit element are to be substantially identical; and
   program code configured to use the marker to identify placement of copies of the circuit element in the IC design.

2. The program product of claim 1, further comprising program code configured to generate dummy shapes including identical dummy shapes about each circuit element as indicated by the marker.

3. The program product of claim 1, wherein the use code prohibits placement of markers such that they overlap.

4. A method of ensuring substantially identical dummy shapes for a circuit element during design of an integrated circuit (IC), the method comprising the steps of:
   using a computer for:
      receiving an IC design including a marker indicating an area about the circuit element in which dummy shapes about the circuit element are to be substantially identical;
      forming the circuit element multiple times within the IC design using the marker to identify placement of copies of the circuit element in the IC design; and
      generating dummy shapes including substantially identical dummy shapes about each circuit element within the area indicated by a respective marker.

5. The method of claim 4, further comprising generating dummy shapes including substantially identical dummy shapes about each circuit element as indicated by the marker.

6. The method of claim 4, wherein the IC design includes a plurality of markers that do not overlap.

* * * * *